United States Patent [19]

Kozak et al.

[11] Patent Number: 5,665,237
[45] Date of Patent: *Sep. 9, 1997

[54] METHOD FOR SEPARATING MATERIALS

[75] Inventors: William G. Kozak, Hatfield; Dharmesh Chovatia, Bensalem; George A. Smith, Newtown, all of Pa.

[73] Assignee: Henkel Corporation, Plymouth Meeting, Pa.

[*] Notice: The portion of the term of this patent subsequent to Aug. 8, 2014, has been disclaimed.

[21] Appl. No.: 395,738

[22] Filed: Feb. 28, 1995

Related U.S. Application Data

[63] Continuation-in-part of Ser. No. 287,014, Aug. 8, 1994, Pat. No. 5,501,796.
[51] Int. Cl.$^6$ ................................................. B01D 11/04
[52] U.S. Cl. ............................................ 210/638; 210/634
[58] Field of Search ...................................... 210/634, 638, 210/511; 562/89, 96

[56] References Cited

U.S. PATENT DOCUMENTS

| | | | |
|---|---|---|---|
| 2,141,569 | 12/1938 | Tucket | 106/27 |
| 3,193,575 | 7/1965 | Nebel et al. | 260/505 |
| 3,277,162 | 10/1966 | Johnson | 260/505 |
| 3,954,491 | 5/1976 | Adrian et al. | 106/100 |
| 4,465,492 | 8/1984 | Putzar | 8/589 |
| 4,661,606 | 4/1987 | Tuominen et al. | 548/497 |
| 4,886,888 | 12/1989 | Tuominen et al. | 548/497 |
| 4,886,889 | 12/1989 | Mattison et al. | 548/487 |
| 4,936,999 | 6/1990 | Mattison et al. | 210/639 |
| 5,015,456 | 5/1991 | Verbueken et al. | 423/395 |
| 5,028,736 | 7/1991 | Girrbach et al. | 562/89 |
| 5,158,603 | 10/1992 | Stierman et al. | 75/743 |
| 5,501,796 | 3/1996 | Kozak et al. | 210/638 |

OTHER PUBLICATIONS

E.A. Knaggs, "Sulfonation and Sulfation," *Encyclopedia of Chemical Technology*, vol. 22, pp. 1–45 (John Wiley & Sons, Inc., NY, NY, 3rd, ed., 1983).

T.C. Lo & M.H.I. Baird, "Extraction Liquid–Liquid", *Encyclopedia of Chemical Technology*, vol. 9, pp. 672–721 (Kirk–Othmer eds, John Wiley & Sons, Inc., NY, NY, 3rd. ed., 1980).

*Chemical Abstract*, vol. 105, Abs. No. 45188v.
*Chemical Abstract*, vol. 92, Abs. No. 29200a.
*Chemical Abstract*, vol. 97, Abs. No. 12615v.
*Chemical Abstract*, vol. 100, Abs. No. 162715x.
*Chemical Abstract*, vol. 104, Abs. No. 131988s.
"Chemistry of Metals Recovery Using LIX® Reagents", Henkel Corporation, 1990–1991 Edition.
"Technology For Decolorization and Deodorization of Fermentation Broths", *Blue Line Technical Bulletin*, Henkel/MID Extraction Technology Group, Tucson, AZ.
Aliquat® 336, *Blue Line Technical Bulletin*, Henkel/MID, Extraction Technology Group, Tucson, AZ.
Alamine ® 308, *Blue Line Technical Bulletin*, Henkel/MID, Extraction Technology Group, Tucson, AZ.
Alamine ® *Blue Line Technical Bulletin*, Henkel/MID, Extraction Technology Group, Tucson, AZ.
Alamine ® 304–1, *Blue Line Technical Bulletin*, Henkel/MID, Extraction Technology Group, Tucson, AZ.
*Encyclopedia of Chemical Technology*, vol. 24, 3rd Ed., pp. 420–426, Kirk–Othmer, John Wiley & Sons, Inc., NY.

*Primary Examiner*—Frank Spear
*Attorney, Agent, or Firm*—Wayne C. Jaeschke; John Daniel Wood; Daniel S. Ortiz

[57] ABSTRACT

A process for the separation of naphthalenesulfonate-based carbonyl condensates from water is provided. The process comprises contacting a mixture comprised of water and a naphthalenesulfonate-based carbonyl condensate (preferably a material selected from the group consisting of formaldehyde condensates of naphthalenesulfonic acids, formaldehyde condensates of lower-alkyl substituted naphthalenesulfonic acids, and mixtures of two or more of such materials) with a liquid organic phase comprised of a cationic lipophilic amine to form an aqueous phase depleted with respect to said mixture of naphthalenesulfonate-based carbonyl condensate and a liquid organic phase enriched in naphthalenesulfonate-based carbonyl condensate. The process further comprises separating said aqueous phase depleted with respect to said minute of naphthalenesulfonate-based carbonyl condensate and said liquid organic phase enriched with respect to naphthalenesulfonate-based carbonyl condensate. The liquid organic phase can then be stripped with an alkaline stripping solution to regenerate the cationic lipophilic amine.

23 Claims, No Drawings

METHOD FOR SEPARATING MATERIALS

CROSS-REFERENCE TO RELATED APPLICATIONS

This application is a continuation-in-part of U.S. Ser. No. 08/287,014, filed Aug. 8, 1994, now U.S. Pat. No. 5,501,796 the disclosure of which is incorporated by reference herein.

FIELD OF THE INVENTION

This invention relates to a process for separating naphthalenesulfonate-based carbonyl condensates from water.

BACKGROUND OF THE INVENTION

Effluents containing organic and/or inorganic contaminants have to be purified for ecological and economic reasons. Such effluents are generated in various processes which employ naphthalenesulfonate-based condensates, e.g. as a dispersant in emulsion polymerizations.

U.S. Pat. No. 5,015,456 (Verbueken et al.) discloses a continuous process for the removal of at least one of nitrate and organic contaminants from an aqueous effluent. The process comprises subjecting said effluent to extractive liquid ion-exchange with a long-chain alkylamine dissolved in an organic solvent and present in the sulfate salt form, and reextracting the loaded organic phase with a base, the treated effluent being recycled for reuse. It is taught that in order to obtain an efficient concomitant extraction of the organic COD-components, even in the presence of considerably higher concentrations of inorganic sulfate ions, the amine extractant should be available in the sulfate form, as is also required for the removal of nitrate.

SUMMARY OF THE INVENTION

This invention relates to a process for the separation of naphthalenesulfonate-based carbonyl condensates from water, said process comprising:

contacting a mixture comprised of water and a naphthalenesulfonate-based carbonyl condensate (preferably a material selected from the group consisting of formaldehyde condensates of naphthalenesulfonic acids, formaldehyde condensates of lower-alkyl substituted naphthalenesulfonic acids, and mixtures of two or more of such materials) with a liquid organic phase comprised of a cationic lipophilic amine to form an aqueous phase depleted with respect to said mixture of naphthalenesulfonate-based carbonyl condensate and an organic phase enriched in naphthalenesulfonate-based carbonyl condensate, and separating said aqueous phase depleted with respect to said mixture of naphthalenesulfonate-based carbonyl condensate and said liquid organic phase enriched with respect to naphthalenesulfonate-based carbonyl condensate.

The process preferably further comprises stripping said liquid organic phase of at least a portion of the naphthalenesulfonate-based carbonyl condensate, i.e. depleting said liquid organic phase of naphthalenesulfonate-based carbonyl condensate, and recycling at least a portion of the depleted liquid organic phase to contact additional mixture of water and a naphthalenesulfonate-based carbonyl condensate.

DETAILED DESCRIPTION OF THE INVENTION

The first step in the process of this invention involves contacting a mixture comprised of water and a naphthalenesulfonate-based carbonyl condensate with a liquid organic phase comprised of a cationic lipophilic amine to form an aqueous phase depleted with respect to said mixture of naphthalenesulfonate-based carbonyl condensate and a liquid organic phase enriched in naphthalenesulfonate-based carbonyl condensate. The naphthalenesulfonate-based carbonyl condensate is preferably a material selected from the group consisting of formaldehyde condensates of naphthalenesulfonic acids, formaldehyde condensates of, lower-alkyl substituted naphthalenesulfonic acids, and mixtures of two or more of such materials. Other examples of naphthalene-based carbonyl condensates include the condensation products of acetone with naphthalenesulfonic acid. The naphthalenesulfonate-based material will typically be a mixture of chemical species. For example, the naphthalene will typically be derived from coal tar or a petroleum base that will contain naphthalene and one or more lower-alkyl naphthalenes. Further, sulfonation of the naphthalene base will typically produce a mixture containing some di-sulfonated naphthalenes and/or some un-sulfonated naphthalenes. The sulfonation of naphthalene is described by E. A. Knaggs, "Sulfonation and Sulfation", *Encyclopedia of Chemical Technology*, vol. 2, p. 1–45 (John Wiley & Sons, Inc., N.Y., N.Y., 3rd ed.,1983), the disclosure of which is incorporated herein by reference.

Naphthaleneformaldehyde sulfonic acid is a mixture of condensation products of naphthalenesulfonic acid and formaldehyde, such condensation products differing, for example, in the degree of polymerization. It can be chromatographed by size exclusion chromatography through a column containing pore sizes which selectively separate molecular volumes according to size, thus allowing one to obtain a measure of the degree of polymerization. The solvent chosen for the acid in chromatography should minimize solute-packing interaction and solute-solute interaction. The chromatogram gives a true molecular volume profile when the eluents are displayed on a detector-strip chart recorder display. For example, if the chromatogram for a sample of the sulfonic acid is the same as that for the sodium naphthaleneformaldehyde sulfonate in U.S. Pat. No. 3,954,491 (Adrian et al, issued May 4, 1976), the two anionic materials are identical. That is, the anionic materials from the acid have the same profile as the anionic materials from the sodium naphthaleneformaldehyde sulfonate having lowest elution volumes of from above 61 to about 70% of the total elution volume and equivalent elution volumes of from about 61 to about 70% of the total elution volume. The teachings in U.S. Pat. No. 3,954,491 relating to chromatography are incorporated by reference herein.

The condensates will generally be water soluble. The naphthalenesulfonic acid and lower alkyl substituted naphthalenesulfonic acids used as starting materials for the condensation will typically have a molecular weight below about 350. Examples of lower alkyl naphthalenesulfonic acids which will be useful herein are those wherein the total of the carbon atoms in the alkyl groups will be less than 16. Such examples include methyl naphthalenes, ethyl naphthalenes, iso-propyl naphthalenes, di-isopropyl naphthalenes, butyl naphthalenes. Typical condensates will have a number average molecular weight of from about 2,000 to about 4,000 and a weight average molecular weight of from about 7,000 to about 13,000.

Preferred examples of naphthalene-based condensates are the formaldehyde condensates of naphthalenesulfonic acids and formaldehyde condensates of lower-alkyl substituted naphthalenesulfonic acids. Sulfonated naphthalenes can be employed in the manufacture of naphthalenesulfonate formaldehyde condensates. As an alternative to pre-sulfonation, the naphthalene base can be sulfonated during the condensation with formaldehyde. Such condensation produces a product that can be considered naphthaleneformaldehyde sulfonic acid and is also known as the naphthalenesulfonic acid-formaldehyde condensates, formalin condensates of beta-naphthalenesulfonic acid, condensation products of naphthalenesulfonic acid with formaldehyde. Naphthalene-formaldehyde sulfonic acid may be prepared by reacting a mixture of naphthalene, formaldehyde and sulfuric acid or oleum. It may be prepared by the processes described in U.S. Pat. No. 2,141,569 (Tucker et al, issued Dec. 27, 1938), U.S. Pat. No. 3,193,575 (Nebel et al, issued Jul. 6, 1965), and U.S. Pat. No. 3,277,162 (Johnson, issued Oct. 4, 1966).

The mixture of water and naphthalenesulfonate-based material will typically contain only a minor amount of naphthalene-based material. Such minor amounts will generally range from about 10 parts per million to about 5% by weight and more typically from about 0.05% to about 1.0% by weight. Typically, the mixture will also be comprised of only minor amounts of other dissolved or dispersed species. Thus, the mixture will typically be at least about 90%, more typically at least about 95%, and most typically at least about 99.0% by weight water.

The first step of the process is to contact the mixture of water and naphthalenesulfonate-based carbonyl condensate with a liquid organic phase comprised of a cationic lipophilic amine. The liquid organic phase comprised of a cationic lipophilic amine will be substantially immiscible with the mixture of water and naphthalenesulfonate-based carbonyl condensate. By "substantially immiscible" is meant that the liquid organic phase, when admixed with the mixture of water and naphthalenesulfonate-based carbonyl condensate to be extracted, will coalesce into a liquid phase that is physically separable from the water of the mixture. This process is, in essence, a liquid-liquid extraction. The principles and mechanics of liquid-liquid extraction are disclosed in T. C. Lo and M. H. I. Baird, "Extraction Liquid-Liquid", Encyclopedia of Chemical Technology, Vol. 9, pp. 672–721 (Kirk-Othmer, eds, John Wiley & Sons, Inc., N.Y., N.Y., 3d ed., 1980), the disclosure of which is incorporated by reference. That article discloses processes and apparatus that can be adapted to the practice of this invention by one of ordinary skill in this art. The substantially immiscible liquid organic phase is preferably truly immiscible or only very sparingly soluble in the mixture to eliminate or minimize the need to remove residual liquid organic phase from the water of the mixture.

The cationic lipophilic amines are amines that have a sufficient number of aliphatic or aromatic carbon atoms to render the amine lipophilic, i.e. essentially insoluble in water, even when in cationic form. The amine will typically have at least 8 carbon atoms, preferably at least 18 carbon atoms. The amine is typically a tertiary amine or quaternary amine. Preferred amines are tri-alkyl tertiary amines or tetra-alkyl quaternary amines wherein the total number of carbon atoms in the alkyl groups is at least 22, preferably at least 25 carbon atoms, and each of at least three of the alkyl groups has at least four carbon atoms. Examples of lipophilic amines include didecyl dimethyl ammonium chloride, tri-isooctyl amine, and tri-($C_8$–$C_{10}$alkyl) methyl ammonium chloride (the latter being a compound where three of the alkyl groups are derived from a source of fatty alkyl groups wherein the eight carbon and ten carbon alkyl groups predominate).

At least a portion of a lipophilic tertiary amine will be in the cationic form during the contacting and separating steps. The quaternary amines will, of course, be cationic during the entire contacting and separating steps. The tertiary amines will be present as the protonated amine, depending upon the precise basicity of the amine and the pH of the mixture of water and naphthalenesulfonate-based carbonyl condensate. It has been found that, under at least some experimental conditions, tri-isooctyl amine did not form a clean phase separation with a mixture of water and naphthalenesulfonate-based carbonyl condensate that was at a pH of about 7. Thus, if such a tertiary amine is used, the pH of the aqueous phase, at least just prior to the separating step, should be on the acid side of neutral, preferably below about pH 3. The nature of the counter-ion of the cationic lipophilic amine is not critical. Quaternary amines are typically available as chlorides and regeneration of the amine with a base will typically leave the amine in its hydroxide form. Thus, the counter-ion of the amine will typically be a non-sulfate counter-ion, but the counter-ions of the cationic lipophilic amines can be other anions, e.g. hydroxides, sulfates, phosphates, etc. or mixtures of two or more different counter-ions.

The cationic lipophilic amines in the liquid organic phase will have a sufficient affinity for the naphthalenesulfonate-based carbonyl condensate to cause the naphthalenesulfonate-based carbonyl condensate to be extracted into the fluid extractant by mass action during the contacting step. To extract the naphthalenesulfonate-based carbonyl condensate from the mixture thereof with water, the liquid organic phase and the mixture are placed in extractive contact (i.e., greater than minimal contact is induced between the liquid organic phase and the mixture of water and naphthalenesulfonate-based carbonyl condensate). Such contact generally involves mixing of the liquid organic phase and the mixture. The conditions under which the mixture of water and naphthalenesulfonate-based carbonyl condensate is mixed with the liquid organic phase generally involve ambient or mildly elevated temperature (e.g., 60° C. to 100° C. and elevated pressure if necessary to contain water or organic vapor).

Both the amount of the liquid organic phase and the amount of the cationic lipophilic amine used may vary broadly. Typically, the liquid organic phase will contain an amount of the cationic lipophilic amine such that the ratio of cationic amine equivalents to sulfonate equivalents of the naphthalenesulfonate-based carbonyl condensate in the mixture is from about 0.1:1 to about 100:1, preferably from about 0.3:1 to about 30:1, and more preferably from about 1:1 to about 6:1. The weight ratio of aqueous phase (provided by the mixture of water and naphthalenesulfonate-based carbonyl condensate) to liquid organic phase may also vary broadly. The precise ratio chosen will depend, at least in part, on the apparatus and operating regime thereof that is chosen for the contacting and separation. For example, if it is desired to perform the separation by skimming the liquid organic phase from the aqueous phase, the weight of the aqueous phase will far exceed the weight of the liquid organic phase, e.g. a weight ratio of aqueous phase to liquid organic phase of from about 50:1 to about 500:1. If, however, it is desired to perform the contacting and separation as a conventional counter-current liquid-liquid extraction, the ratio of the weight ratio of aqueous phase to liquid organic phase will typically be much closer to unity e.g. a weight ratio of from about 5:1 to about 1:5, more typically from about 2:1 to about 1:2.

The liquid organic phase can consist solely of the cationic lipophilic amine or a suitable diluent can be added. A suitable diluent will be substantially immiscible with the aqueous phase. Examples of suitable diluents include paraffinic solvents and/or isoparaffinic solvents with or without minor amounts of additives miscible with the diluent that modify the polarity of the of the diluent, e.g. fatty alcohols.

After being placed in extractive contact, the aqueous phase and liquid organic phases are separated. Generally, the phases will separate, e.g., coalesce, into separate phases during the quiescent period following the cessation of mixing of the two phases. One of the phases, typically the liquid organic phase, will typically have a lower density than the other phase, typically the aqueous phase, which will allow one to physically separate the two phases, e.g., by decanting off the liquid organic phase.

The method of contacting and separating can be operated in a batch of a continuous mode. Thus, the liquid organic phase with a cationic lipophilic amine can be divided into a plurality of aliquots for multiple batch extractions of the mixture of water and naphthalenesulfonate-based carbonyl condensate (i.e., a multistage extraction) or it can be contacted with the mixture in a continuous manner (e.g., co-current, cross-current or counter-current). Apparatus conventionally employed in liquid-liquid extractions include un-agitated columns, mixer-settlers, pulsed columns, rotary agitated columns, reciprocating plate columns, and centrifugal extractors. The apparatus employed to effect the method of contacting and separating will, of course, be appropriate for the precise method of contacting and separating that is chosen.

In certain embodiments of the invention, the extraction unit is operated in a batch mixer-settler mode. In batch mixer-settler mode, the mixture of water and naphthalenesulfonate-based carbonyl condensate are fed to a stirred vessel and the contents are mixed. Mixing is then stopped and the contents of the vessel are allowed to settle and thus form distinct aqueous and liquid organic phases. The resulting aqueous and liquid organic phases are then separated by decanting liquid off the top or drawing liquid from the bottom. If desired, the liquid organic phase is removed from the mixer settler and a second extraction of the same aqueous phase is effected by adding fresh liquid organic phase then the sequence mixing and settling is repeated. When multiple vessels are employed, the vessels can be operated in parallel or in staggered sequence. Multiple vessels can be arranged in a cascade wherein liquid organic phase effluent from one vessel that contains an aqueous phase having a relatively low concentration of naphthalenesulfonate-based carbonyl condensate can be used as the liquid organic phase in one or more other vessels that contain an aqueous phase having a relatively high concentration of naphthalenesulfonate-based carbonyl condensate.

In a typical continuous process of this invention employing a stirred column, a mixture of water and naphthalenesulfonate-based carbonyl condensate is fed into a first feed port (for a heavier liquid, near the top of a vertical, stirred, extractor column). The mixture falls through the column while a liquid organic phase Containing a cationic lipophilic amine is fed to a second feed port (for a lighter liquid, near the base Of the column). The liquid organic phase rises through the stirred column, i.e., countercurrent to the flow of the mixture of water and naphthalenesulfonate-based carbonyl condensate. In an un-stirred portion of the column just below the second feed port, the aqueous phase is withdrawn from the column through a bottom exit port below this zone of separation. Likewise, in an un-stirred portion of the column just above the first feed port, the liquid organic phase is withdrawn from the column through a top exit port. Typically, the aqueous phase will be present in the column as a continuous phase, while the liquid organic phase is typically discontinuous.

After the step of separating the aqueous and liquid organic phases, the naphthalenesulfonate-based carbonyl condensate can be separated from the liquid organic phase, e.g. by contacting the liquid organic phase with an aqueous stripping solution. The stripping solution should have sufficient alkalinity so that hydroxide anions from the aqueous stripping solution will displace at least a portion of the naphthalenesulfonate-based carbonyl condensate from the liquid organic phase and convert at least a portion of the cationic lipophilic amine to the hydroxide or free base form. Preferably, the stripping solution will be a dilute aqueous solution which contains sodium hydroxide in stoichiometric excess to the cationic lipophilic amine in the liquid organic phase. The stripped liquid organic phase can then be recycled to the contacting step.

The mixture of water and naphthalenesulfonate-based carbonyl condensate can be pre-treated or the separated aqueous phase can be post-treated using other purification techniques, e.g. treatment with activated carbon. Depending upon the precise extraction technique employed, it may be convenient to integrate such pre-treatment or post-treatment with the extraction, e.g. activated carbon can be co-mixed with the aqueous and liquid organic phases during the contacting step and the separated from at least the aqueous phase.

The extent of the reduction in concentration of naphthalenesulfonate-based carbonyl condensate in the aqueous phase will, of course, depend upon the extent of contact with the liquid organic phase and the precise efficiency of the liquid organic phase under the given contact conditions. Generally, the liquid organic phase will remove at least a significant portion of the naphthalenesulfonate-based carbonyl condensate. By "significant" is meant more than a nominal amount, e.g., at least 10% by weight and preferably at least 30% by weight of the naphthalenesulfonate-based carbonyl condensate in the mixture of water and naphthalenesulfonate-based carbonyl condensate. Preferably, the concentration of naphthalenesulfonate-based carbonyl condensate in the water after said contacting and separating are completed will be less than 0.1%, more typically less than 0.01%, and preferably less than 0.001%.

The subject matter of this application is similar to the subject matter of U.S. Serial No. (Case No. M5554 FPD/PI), filed on even date herewith by M. Virnig et al. and entitled "Method of Recovery of Polymers", the disclosure of which is incorporated herein by reference.

The following examples are intended to illustrate the invention without limiting it in any way.

EXAMPLES

Example 1

An effluent water sample containing about 0.237% by weight of the naphthalenesulfonate-based carbonyl condensate (the condensate being available as Lomar PL from Henkel Corp., Ambler, Pa.) was obtained. The effluent water sample was a hazy, yellow-colored solution. The effluent water sample exhibited a pH of about 7. An amount of didecyl dimethyl ammonium chloride equal to about 1% by weight of the effluent water sample was added to a portion of the sample of effluent water by adding one or two drops of neat didecyl dimethyl ammonium chloride in a two ounce bottle of the effluent water. The bottle was capped and lightly shaken by hand.

Seconds after shaking was stopped, a viscous yellow droplet formed on top and stuck to the inside walls of the bottle. The bottom phase (aqueous) was still turbid, but no longer yellow. The sample was then centrifuged and the aqueous phase was analyzed for naphthalenesulfonate-based carbonyl condensate by conducting a UV scan from 190 nm to 400 nm with a Perkin Elmer spectrophotometer. The absorbance of the aqueous phase at 230 nm was compared with the absorbance at 230 nm of a known sample of 20 ppm the naphthalenesulfonate-based carbonyl condensate Lomar PL in water. From ratio of the absorbances of the aqueous phase and the known sample, it was concluded that greater than 99% of the naphthalenesulfonate-based carbonyl condensate had been removed from the effluent water sample.

Example 2

The procedure of Example 1 was repeated with a new portion of the same effluent water sample, but instead of 1% by weight of didecyl dimethyl ammonium chloride, only 0.5% by weight of didecyl dimethyl ammonium chloride was added along with 0.5% of activated carbon (commercially available as Nuchar SA). The activated carbon and the didecyl dimethyl ammonium chloride formed a clumpy phase that readily settled out on the bottom of the bottle and the aqueous phase was clear. The absorbance of the aqueous phase showed that the aqueous phase contained even less naphthalenesulfonate-based carbonyl condensate than the product of Example 1. The sample also contained less naphthalenesulfonate-based carbonyl condensate than a comparative sample treated solely with activated carbon (wherein only 1% by weight of activated carbon was added to a new portion of the effluent water sample, the sample was shaken, centrifuged, and the absorbance of the aqueous phase at 230 nm was measured).

Example 3

The procedure of Example 1 was repeated with a new portion of the same effluent water sample, but 1% by weight of neat tri-($C_8$–$C_{10}$alkyl) methyl ammonium chloride (available as Aliquat 336 from Henkel Corp., Ambler, Pa.) was used instead of the 1% by weight of didecyl dimethyl ammonium chloride. The results were comparable to the results of Example 1, but the top phase of the product of this example was less sticky than the top phase of Example 1 and the bottom phase of this example was less turbid than the bottom phase of Example 1.

Example 4

The procedure of Example 1 was repeated with a new portion of the same effluent water sample, but 1% by weight of neat tri-isooctyl amine (available as Alamine 308 from Henkel Corp., Ambler, Pa.) was used instead of the 1% by weight of didecyl dimethyl ammonium chloride. The product of this example did not phase break cleanly which is not surprising given the near neutral pH of the effluent water sample. It is thought that if the pH of the effluent water sample were adjusted to below pH 3, the tri-isooctyl amine would exist as the hydrogen tri-isooctyl ammonium cation and a phase separation could then be obtained.

Example 5

The procedure of Example 1 can be repeated with a new portion of the same effluent water sample, but extracted in two stages with a solution of 7.1 grams per liter of tri-($C_8$–$C_{10}$alkyl) methyl ammonium chloride (available as Aliquat 336 from Henkel Corp., Ambler, Pa.) in the commercially available solvent Escaid 110 containing 75 grams per liter of tridecyl alcohol.

What is claimed is:

1. A process for the separation of naphthalenesulfonate-based carbonyl condensates from water, said process comprising:

contacting a mixture comprised of water and a naphthalenesulfonate-based carbonyl condensate with a liquid organic phase comprised of a cationic lipophilic tertiary amine to form an aqueous phase depleted with respect to said mixture of naphthalenesulfonate-based carbonyl condensate and a liquid organic phase enriched in naphthalenesulfonate-based carbonyl condensate, wherein the pH of said mixture is sufficiently low to obtain a clean phase separation between said aqueous phase and said organic phase, and separating said aqueous phase depleted with respect to said mixture of naphthalenesulfonate-based carbonyl condensate add said liquid organic phase enriched with respect to naphthalenesulfonate-based carbonyl condensate.

2. A process as claimed in claim 1 wherein said naphthalenesulfonate-based carbonyl condensate is a member selected from the group consisting of formaldehyde condensates of naphthalenesulfonic acids, formaldehyde condensates of lower-alkyl substituted naphthalenesulfonic acids, and mixtures of two or more of such members.

3. A process as claimed in claim 1 wherein said naphthalenesulfonate-based carbonyl condensate has a number average molecular weight of from about 2,000 to about 4,000 and a weight average molecular weight of from about 7,000 to about 13,000.

4. A process as claimed in claim 1 wherein said naphthalene-based condensate comprises 10 parts per million to about 5% by weight of said mixture thereof with water.

5. A process as claimed in claim 1 wherein said naphthalene-based condensate comprises from about 0.05% to about 1.0% by weight of said mixture thereof with water.

6. A process as claimed in claim 1 wherein said mixture is comprised of at least about 95% water.

7. A process as claimed in claim 1 wherein said cationic lipophilic amine is selected from the group consisting of tertiary amines having at least 18 carbon atoms.

8. A process as claimed in claim 1 wherein said cationic lipophilic amine is selected from the group of tri-alkyl tertiary amines wherein the total number of carbon atoms in the alkyl groups is at least 22 and each of the alkyl groups has at least four carbon atoms.

9. A process as claimed in claim 1 wherein said cationic lipophilic amine has at least 25 carbon atoms.

10. A process as claimed in claim 1 wherein said cationic lipophilic amine has a non-sulfate counter-ion.

11. A process as claimed in claim 1 wherein said cationic lipophilic amine has a chloride or hydroxide counter-ion.

12. A process as claimed in claim 1 wherein the ratio of cationic amine equivalents of said cationic lipophilic amine to sulfonate equivalents of said naphthalenesulfonate-based carbonyl condensate is from about 0.1:1 to about 100:1.

13. A process as claimed in claim 1 wherein the ratio of cationic amine equivalents of said cationic lipophilic amine to sulfonate equivalents of said naphthalenesulfonate-based carbonyl condensate is from about 0.3:1 to about 30:1.

14. A process as claimed in claim 1 wherein said separation is effected by skimming the liquid organic phase from the aqueous phase provided by the mixture of water and naphthalenesulfonate-based carbonyl condensate.

15. A process as claimed in claim 1 wherein the weight ratio of aqueous phase provided by the mixture of water and naphthalenesulfonate-based carbonyl condensate to liquid organic phase is from about 50:1 to about 500:1.

16. A process as claimed in claim 1 wherein the weight ratio of aqueous phase provided by the mixture of water and naphthalenesulfonate-based carbonyl condensate to liquid organic phase is from about 5:1 to about 1:5.

17. A process as claimed in claim 1 wherein said process further comprises stripping said liquid organic phase of at least a portion of the naphthalenesulfonate-based carbonyl condensate and recycling at least a portion of the stripped liquid organic phase to contact additional mixture of water and a naphthalenesulfonate-based carbonyl condensate.

18. A process as claimed in claim 17 wherein said stripping employs an aqueous stripping solution having sufficient alkalinity so that hydroxide anions from said aqueous stripping solution will displace at least a portion of the naphthalenesulfonate-based carbonyl condensate from the liquid organic phase and convert at least a portion of the cationic lipophilic amine to the free base form.

19. A process as claimed in claim 17 wherein said stripping employs an aqueous stripping solution which is a dilute aqueous solution containing sodium hydroxide in stoichiometric excess to the cationic lipophilic amine in the liquid organic phase.

20. A process as claimed in claim 1 wherein said contacting and separating are effective in reducing the concentration of said naphthalenesulfonate-based carbonyl condensate in said mixture to less than about 0.01% by weight.

21. A process as claimed in claim 1 wherein said pH of said mixture is on the acid side of neutral.

22. A process as claimed in claim 1 wherein said pH of said mixture is below about pH 3.

23. A process for the separation of naphthalenesulfonate-based carbonyl condensates from water, said process comprising:

contacting a mixture comprised of water and a naphthalenesulfonate-based carbonyl condensate selected from the group consisting of formaldehyde condensates of naphthalenesulfonic acids, formaldehyde condensates of lower-alkyl substituted naphthalenesulfonic acids, and mixtures of two or more of such members, said condensate having a number average molecular weight of from about 2,000 to about 4,000 and a weight average molecular weight of from about 7,000 to about 13,000, wherein said naphthalene-based condensate comprises 10 parts per million to about 5% by weight of said mixture thereof with water, wherein said mixture has a pH below about 3, with a liquid organic phase comprised of a cationic lipophilic amine selected from the group of tri-alkyl tertiary amines wherein the total number of carbon atoms in the alkyl groups is at least 22 and each of the alkyl groups has at least four carbon atoms, wherein the ratio of cationic amine equivalents of said cationic lipophilic amine to sulfonate equivalents of said naphthalenesulfonate-based carbonyl condensate is from about 0.3:1 to about 30:1, to form an aqueous phase depleted with respect to said mixture of naphthalenesulfonate-based carbonyl condensate and a liquid organic phase enriched in naphthalenesulfonate-based carbonyl condensate, and separating said aqueous phase depleted with respect to said mixture of naphthalenesulfonate-based carbonyl condensate and said liquid organic phase enriched with respect to naphthalenesulfonate-based carbonyl condensate, wherein said contacting and separating are effective in reducing the concentration of said naphthalenesulfonate-based carbonyl condensate in said mixture to less than about 0.01% by weight.

* * * * *

UNITED STATES PATENT AND TRADEMARK OFFICE
CERTIFICATE OF CORRECTION

PATENT NO.  : 5,665,237
DATED       : September 9, 1997
INVENTOR(S) : William G. Kozak et al.

It is certified that error appears in the above-indentified patent and that said Letters Patent is hereby corrected as shown below:

Title page,
In the Abstract [57], line 15, the word "minute" should be --mixture--.

In Claim 21, Col. 8, line 21, the word "add" should be --and--.

Signed and Sealed this

Sixteenth Day of December, 1997

Attest:

BRUCE LEHMAN

Attesting Officer

Commissioner of Patents and Trademarks